(12) United States Patent
Jeon (10) Patent No.: US 7,393,200 B2
(45) Date of Patent: Jul. 1, 2008

(54) ELECTROMOTION ICE-CREAM DISHER

(76) Inventor: Sunnie K. Jeon, 20294 Via Cellini, Northridge, CA (US) 91326

( * ) Notice: Subject to any disclaimer, the term of this patent is extended or adjusted under 35 U.S.C. 154(b) by 0 days.

(21) Appl. No.: 11/245,277

(22) Filed: Oct. 6, 2005

(65) Prior Publication Data

US 2006/0182835 A1    Aug. 17, 2006

(30) Foreign Application Priority Data

Oct. 9, 2004    (KR)    ........................ 10-2004-0080670

(51) Int. Cl.
*A23G 9/28*    (2006.01)
(52) U.S. Cl. ..................... 425/279; 425/280; 425/281; 425/282
(58) Field of Classification Search ......... 425/276–286, 425/221; 30/124, 324; D7/681
See application file for complete search history.

(56) References Cited

U.S. PATENT DOCUMENTS 2,109,598 A * 3/1938 Stasinski et al. ............. 425/278
2,201,403 A * 5/1940 Knaust ........................ 425/150
4,071,308 A * 1/1978 LaFreda ...................... 425/284
4,850,843 A * 7/1989 Ralls ........................... 425/279

* cited by examiner

*Primary Examiner*—Donald Heckenberg
(74) *Attorney, Agent, or Firm*—Dilworth & Barrese, LLP (57) ABSTRACT

There is provided an electromotion ice-cream disher, in which sawteeth are formed at a lower portion of a rotating cap disposed inside a holder and a receiving groove for receiving ice cream is formed, such that that ice cream can be easily taken from a container and placed on a dish or plate easily by rotation and upward/downward motion of the receiving groove. In the electromotion ice-cream disher, a hemispherical rotational cap is provided inside the holder and is integrally formed with a connecting pipe passing through the holder and has sawteeth at a lower portion, such that the rotational cap is rotatable within the holder by a stop washer. A spline shaft is connected to a drive shaft of a drive motor and inserted/protruded to/from the connecting pipe and transfers a rotational force of the drive motor to the rotational cap. A solenoid has a rod connected to the drive motor. An elastic spring is installed below the drive motor and the drive motor moves upward and downward due to the rod protruded downward when an electric signal is applied to the solenoid and an elastic force of the elastic spring. A holder plate is provided at a lower portion of the spline shaft passing through the connecting pipe and moves upward/downward by the upward/downward motion of the drive motor. A switch part is connected to the drive motor and the solenoid and is supplied with power from a battery and controls rotation/stop of the drive motor and the applying and cutting-off of the electric signal to the solenoid.

1 Claim, 8 Drawing Sheets

ELECTROMOTION ICE-CREAM DISHER

BACKGROUND OF THE INVENTION

1. Field of the Invention

The present invention relates to an ice-cream disher, and more particularly, to an electromotion ice-cream disher, in which sawteeth are formed at a lower portion of a rotating cap disposed inside a holder and a receiving groove for receiving ice cream is formed, such that that ice cream can be easily taken from a container and placed on a dish or plate easily by rotation and upward/downward motion of the receiving groove.

2. Description of the Related Art

In general, ice cream is a favorite food that is created by freezing composition mixed according to one's taste so as to cool down one's body in hot summer. In a method for making ice cream, egg, saccharine and stabilizer are added to cream, milk or dairy product, and then desired milk fat, milk solid not fat, and sweetener are mixed to thereby create base mix composition. Then, the base mix composition is heated to about 60° C. and is put into a homogeniser to disperse fat. Thereafter, the composition is sterilized at 3.63° C. for 30 minutes and 75° C. for 15 minutes, and then is cooled down to 2–5° C. The cooled composition is added to a flavor and maintained in a cooled state during 4–12 hours. Then, the cooled composition is mixed to contain air and is frozen to −5° C. to −10° C.

There are several types of ice cream according to package. A bar-type ice cream is produced by inserting a stick into ice cream, and a corn-type ice cream is produced by containing ice cream in a corn-shaped snack. A cup-type ice cream is produced by containing ice cream in a paper cup. In the case of the corn-type ice cream and a cup-type ice cream, an ice-cream disher is used to take a predetermined amount of ice cream from a large ice cream container and place it in a corn or cup.

A conventional ice-cream disher will be described with reference to FIG. 1.

Figure 1:
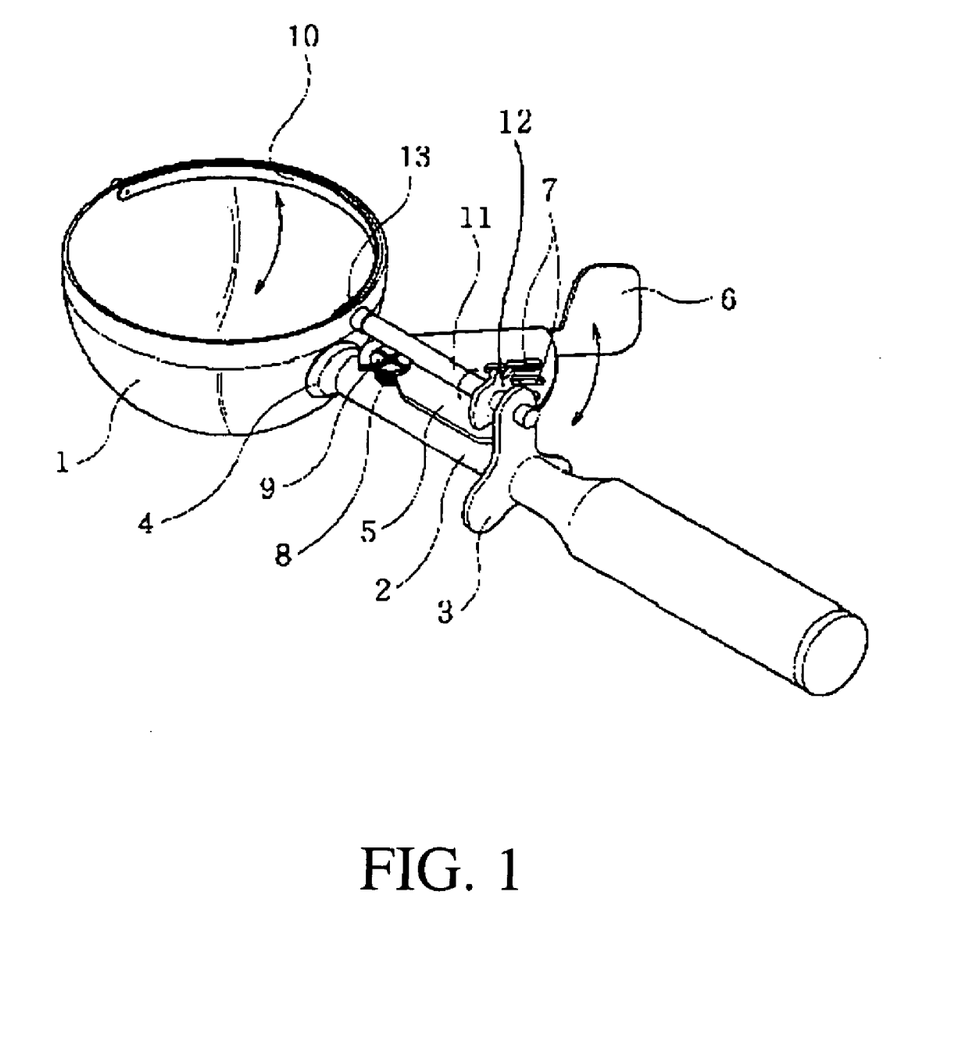
FIG. 1 is a perspective view of a conventional ice-cream disher.

FIG. 1 is a perspective view of a conventional ice-cream disher.

Referring to FIG. 1, one end of a handle connection rod 2 having a support plate 3 is fixed to a middle portion of a holder 1, and a connecting portion 4 of the handle connection rod 2 is caulked with epoxy resin. In an upper portion of the handle connection rod 2, an operation plate 5 where a lever 6 and a plurality of gear grooves 7 are molded integrally is fixed to a plate fixing screw 9 together with a spring 8. One side of the spring 8 is locked to an inner side of the lever 6, and the other side is locked to a support plate 3.

Also, a holder belt 10 is formed inside the holder 1. One end of a rotational shaft 11 integrally molded with a gear 12 rotatably passes through the holder 1 and is welded with the holder belt 10. The welding portion is welded of tin. The other end of the rotational shaft 11 is rotatably connected to an upper portion of the support plate 3.

The handle has an empty space in its inside. A handle connection screw is put in the inner space and is screwed to a rear end of the connection rod 2.

When the lever 6 is pulled, the spring 8 is contracted and the gear groove 7 formed at the operation plate 5 moves. At this point, since the gear 12 is engaged with the gear groove 7, the gear 12 rotates as the gear groove 7 moves, thus rotating the rotational rod 11 integrally formed with the gear 12 and the holder belt 10. Accordingly, if the lever 6 is pulled when taking ice cream and placing it in a dish or plate using the holder 1, the holder belt 10 rotates while coming in contact with an inner surface of the holder 1, such that ice cream can be easily put in the dish or plate.

However, the conventional ice-cream disher has following problems.

Since ice cream is frozen at a temperature of below zero so as to maintain solid state without melting, a predetermined strength and viscosity is maintained. Accordingly, a strong strength is required when taking ice cream from the ice-cream container. Thus, a user's hand grasping the ice-cream disher may suffer from pain.

Also, ice cream contained in the holder is adhered to the inner surface of the holder. Even when the holder belt is rotated while coming in contact with the inner surface of the holder, ice cream adhered to the inner surface of the holder is difficult to completely take off, even though the holder belt is rotated, because ice cream is again adhered to the inner surface of the holder while it rotates as the holder belt rotates. In order to completely take off ice cream from the holder, the holder belt must be rotated many times.

SUMMARY OF THE INVENTION

Accordingly, the present invention is directed to an electromotion ice-cream disher that substantially obviates one or more problems due to limitations and disadvantages of the related art.

An object of the present invention is to provide an electromotion ice-cream disher, in which ice cream can be easily taken form an ice-cream container by installing the rotational cap rotating due to rotational force of a drive motor inside a holder and forming sawteeth at a lower portion of the rotational cap.

Another object of the present invention is to provide an electromotion ice-cream disher, in which ice cream received in a rotational cap can be easily placed on another container by pushing it through upward/downward motion of a holder plate disposed at an inner side of a rotational cap by using downward motion of a rod of a solenoid and tensile force of an elastic spring.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an electromotion ice-cream disher including a holder for receiving an ice cream taken from a container and a handle connected to the holder for easy grasp, the electromotion ice-cream disher including: a hemispherical rotational cap provided inside the holder, wherein the rotational cap is integrally formed with a connecting pipe passing through the holder and has sawteeth at a lower portion, the rotational cap being rotatable within the holder by a stop washer; a spline shaft connected to a drive shaft of a drive motor and inserted/protruded to/from the connecting pipe, wherein the spline shaft transfers a rotational force of the drive motor to the rotational cap; a solenoid having a rod connected to the drive motor; an elastic spring installed below the drive motor, wherein the drive motor moves upward and downward due to the rod protruded downward when an electric signal is applied to the solenoid and an elastic force of the elastic spring; a holder plate provided at a lower portion of the spline shaft passing through the connecting pipe, wherein the holder plate moves upward/downward by the upward/downward motion of the drive motor; and a switch part connected to the drive motor and the solenoid, wherein the switch part is supplied with power from a battery and controls rotation/stop of the drive motor and the applying and cutting-off of the electric signal to the solenoid.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, an electromotion ice-cream disher according to a preferred embodiment of the present invention will be described in detail with reference to the accompanying drawings.

Figure 2:
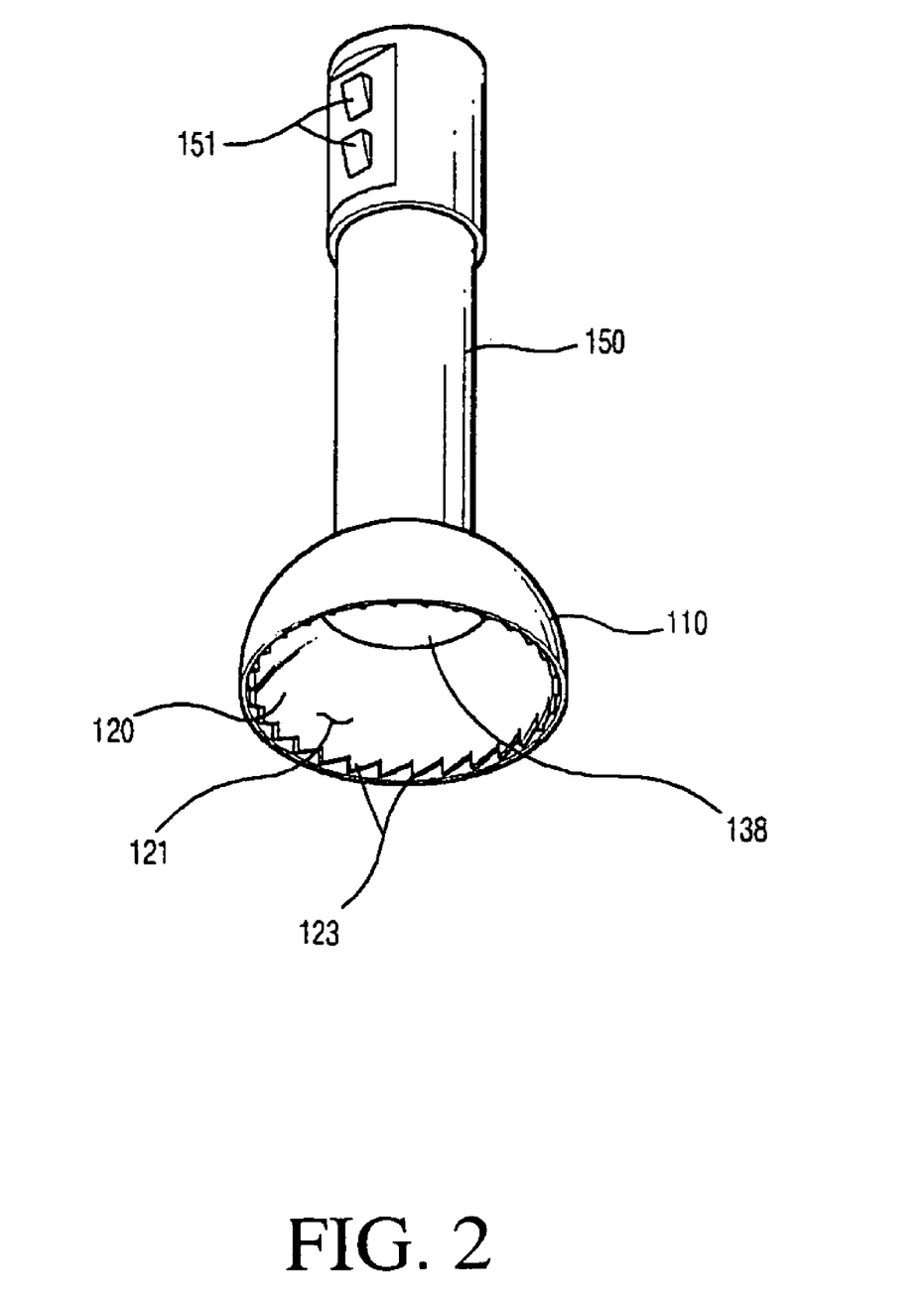
FIG. 2 is a perspective view of an electromotion ice-cream disher according to an embodiment of the present invention.
Figure 3:
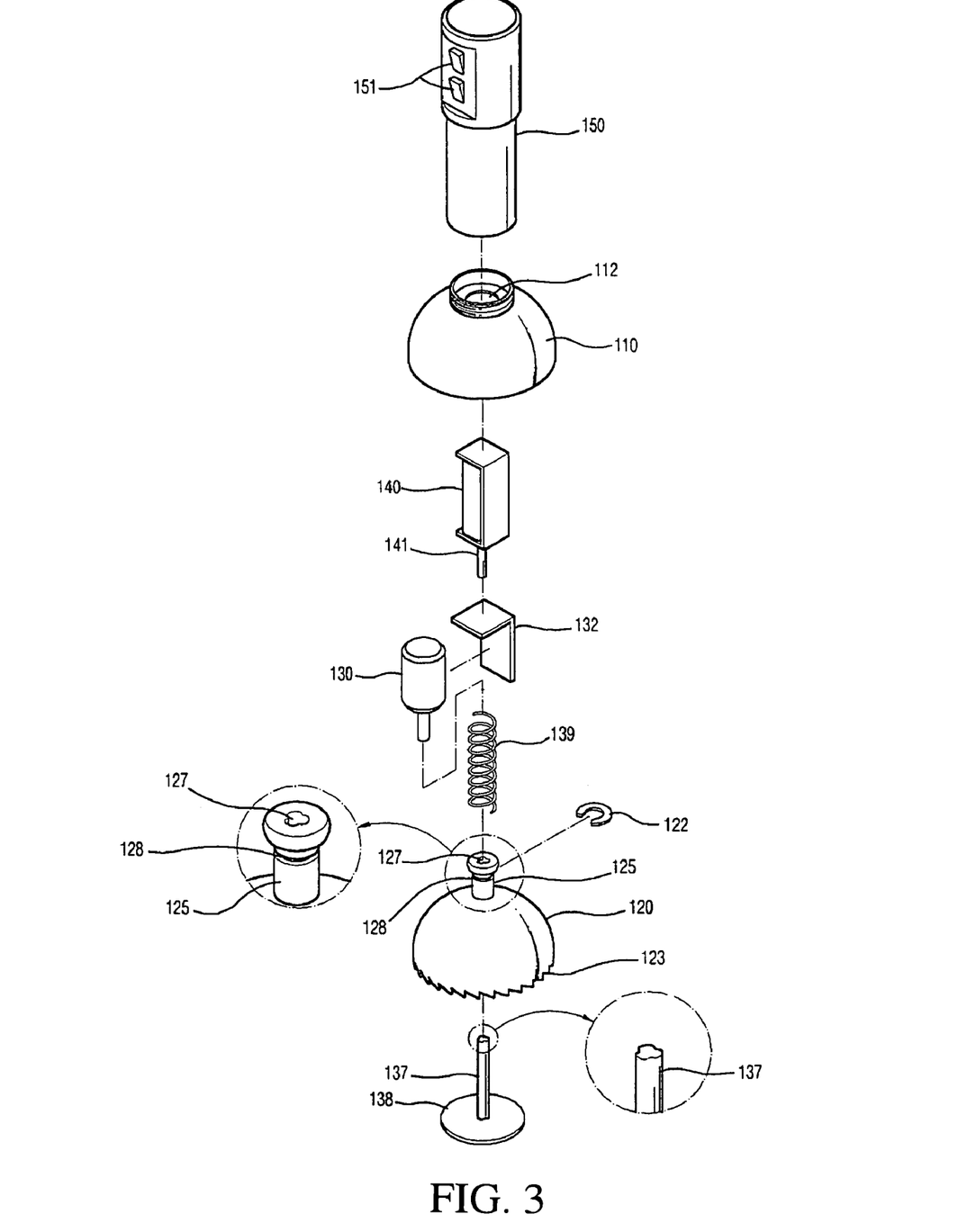
FIG. 3 is an exploded perspective view of an electromotion ice-cream disher according to an embodiment of the present invention.

FIG. 2 is a perspective view of an electromotion ice-cream disher according to the present invention, and FIG. 3 is an exploded perspective view of the electromotion ice-cream disher according to the present invention.

Referring to FIGS. 2 and 3, the electromotion ice-cream disher includes: a holder 110; a rotational cap 120 installed inside the holder 110 and having a receiving groove 121 for containing ice cream; a drive motor 130 for providing a rotational force to the rotational cap 120; a solenoid 140 and an elastic spring 139 for providing upward/downward motion to the drive motor 130 to take off ice cream from the rotational cap 120; and a handle 150 for receiving the solenoid 140 and the elastic spring 139, the handle 150 having a switch part 151 for controlling them.

The holder 110 has a hemispherical opening at a lower portion and a connecting pipe at an upper portion. The connecting pipe has a screw part formed an outer periphery. At this point, a through-hole 112 is formed at an inner side of the connecting pipe, that is, an upper portion of the holder 110.

Meanwhile, the rotational cap 120 installed in the holder 110 has an ice-cream receiving groove 121 at its inside, a plurality of sawteeth 123 at its lower portion, a connecting pipe 125 at its upper portion, respectively. The connecting pipe 125 has a spline groove 127 at its inside and a connecting groove 128 at its outer periphery such that a stop washer 132 can be inserted thereto, respectively. Also, a plurality of grooves are formed at an inner periphery of the spline groove 127.

The drive motor 130 installed above the rotational cap 120 is fixed to a ]-shaped bracket 132, and a spline shaft 137 is connected to a lower portion of a drive shaft of the drive motor 130. At this point, a plurality of protrusions are formed at an outer periphery of the spline shaft 137 such that they can be engaged with the plurality of grooves formed at the inner periphery of the spline groove 127.

The solenoid 140 installed above the drive motor 130 for proving the rotational force to the rotational cap 120 has a rod 141 inserted/protruded downward at one side thereof.

On one side of the outer periphery of the handle 150 where the drive motor 130 and the solenoid 140 are received, the switch part is installed to control rotation/stop signals of the drive motor 130 and downward motion of the rod 141. It is preferable that the switch part 151 should be provided with an on/off switch.

Also, a battery B for supplying voltage to the drive motor 130 and the solenoid 140 is installed on an upper portion of the inner periphery of the handle 150, and a nut part is formed at a lower portion thereof.

The connecting pipe 125 is inserted into the through-hole 112 of the holder 110 and the stop washer 122 is inserted/fixed into the connecting groove 128 of the connecting pipe 125. Accordingly, the rotational cap 120 is rotatable within the holder 110. The spline shaft 137 is inserted/protruded at the spline groove 127. At this point, a holder plate 138 is connected to a lower portion of the spline shaft 137, and the drive shaft of the drive motor 130 is connected to the spline shaft 137 protruded toward the upper portion of the connecting pipe 125. The elastic spring 139 is inserted to the outer periphery of the drive shaft of the drive motor 130. Also, the ]-shaped bracket 132 is in contact with the rod 141 of the solenoid 140. At this point, the drive motor 130 and the solenoid 140 are connected to the switch part 151 and the battery B to thereby control the drive motor 130 and the solenoid 140 and supply power. The handle 150 where the switch part 151 and the battery B are installed is screwed with the holder 110.

According to such an electromotion ice-cream disher, ice cream can be easily taken from the container and put on the dish or plate using the rotational force of the drive motor, the downward motion of the solenoid and the elastic force of the spring. A series of usage relationship and interaction in the electromotion ice-cream disher will be described below.

Figure 4A:
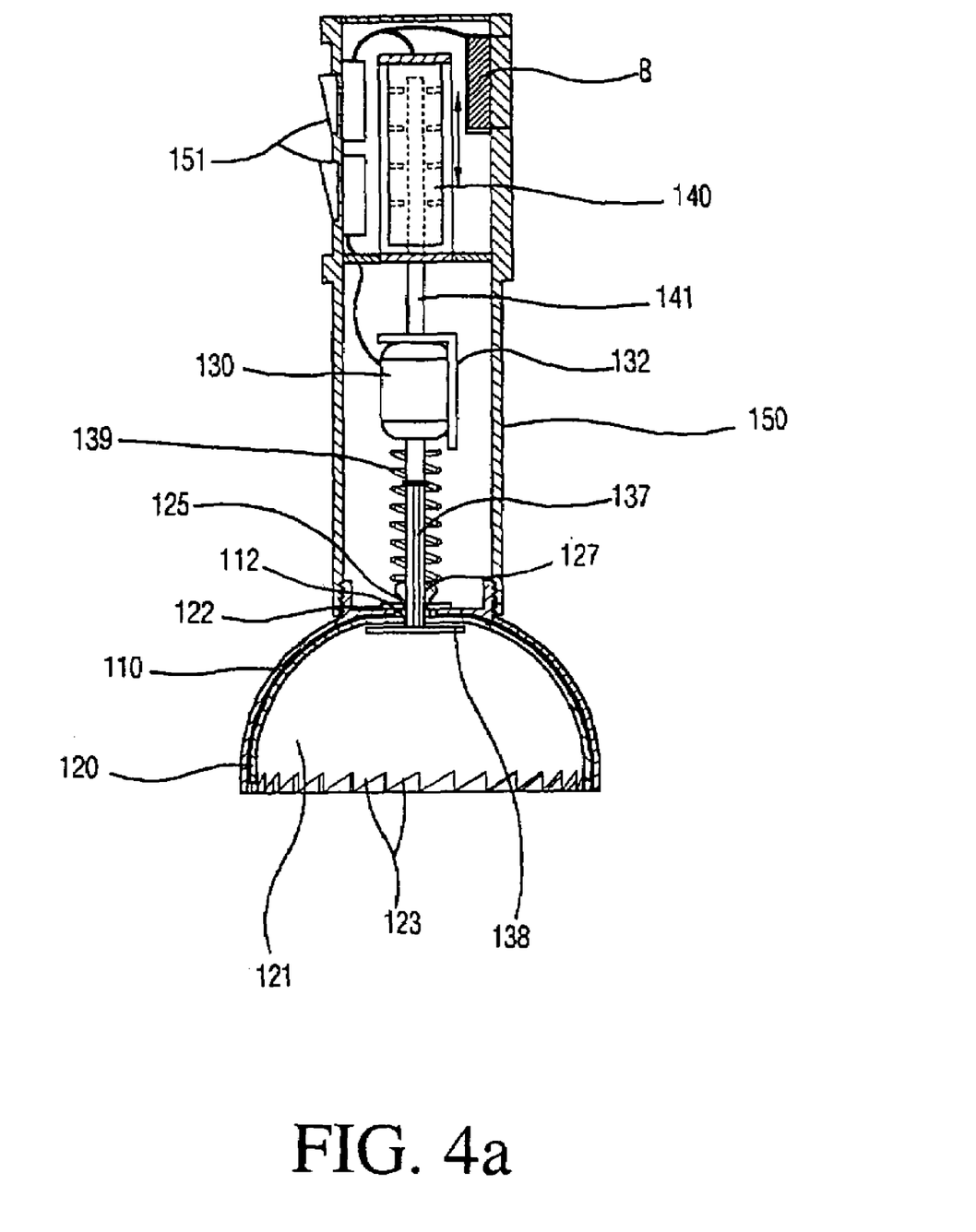
FIGS. 4A and 4B are sectional views illustrating operation state of the electromotion ice-cream disher according to an embodiment of the present invention.
Figure 4B:
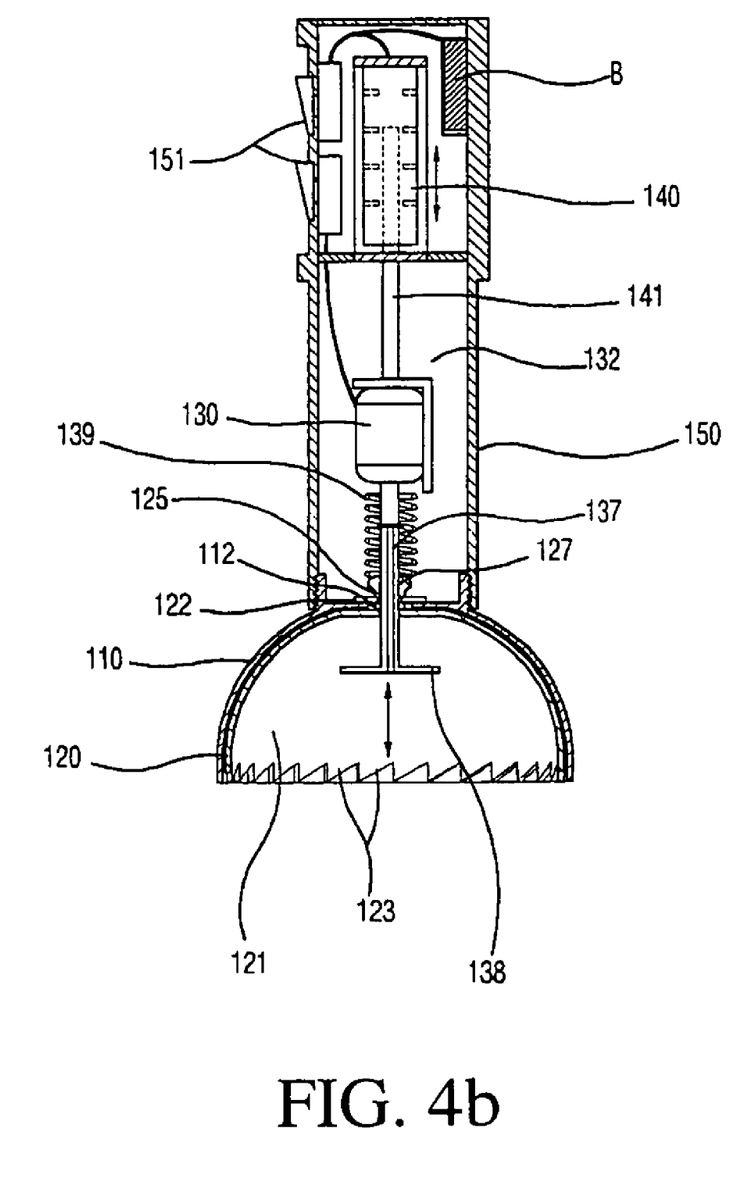
Figure 5A:
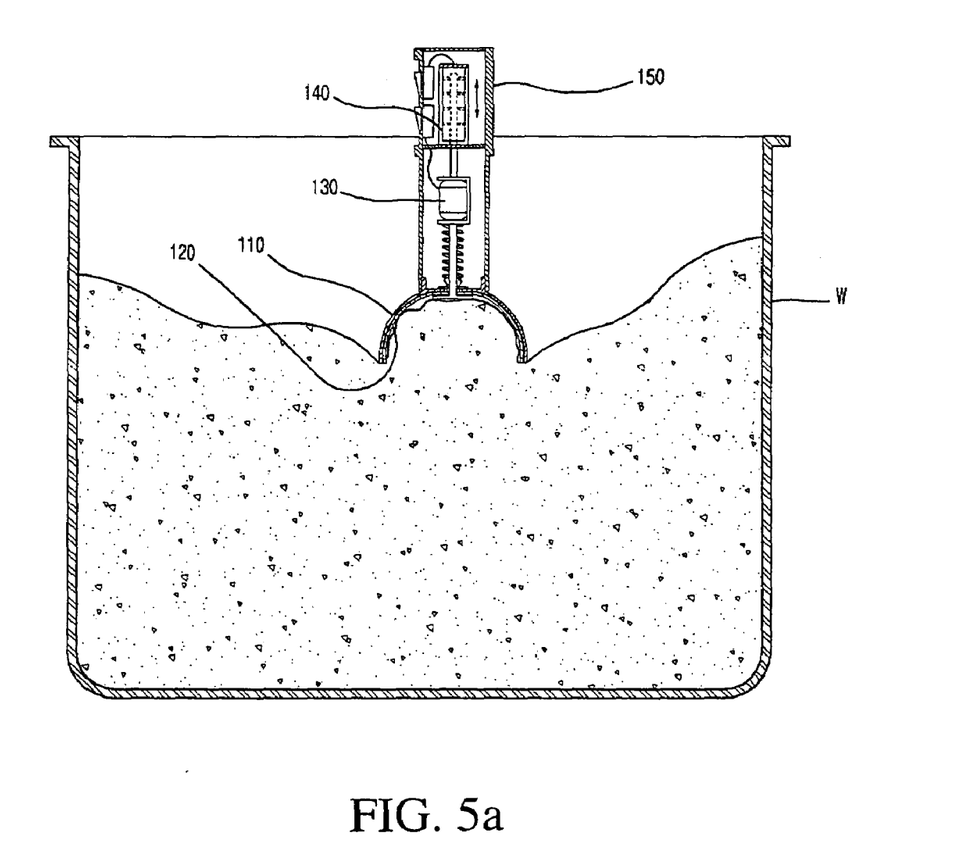
FIGS. 5A through 5C are sectional views illustrating usage state of the electromotion ice-cream disher according to an embodiment of the present invention.
Figure 5B:
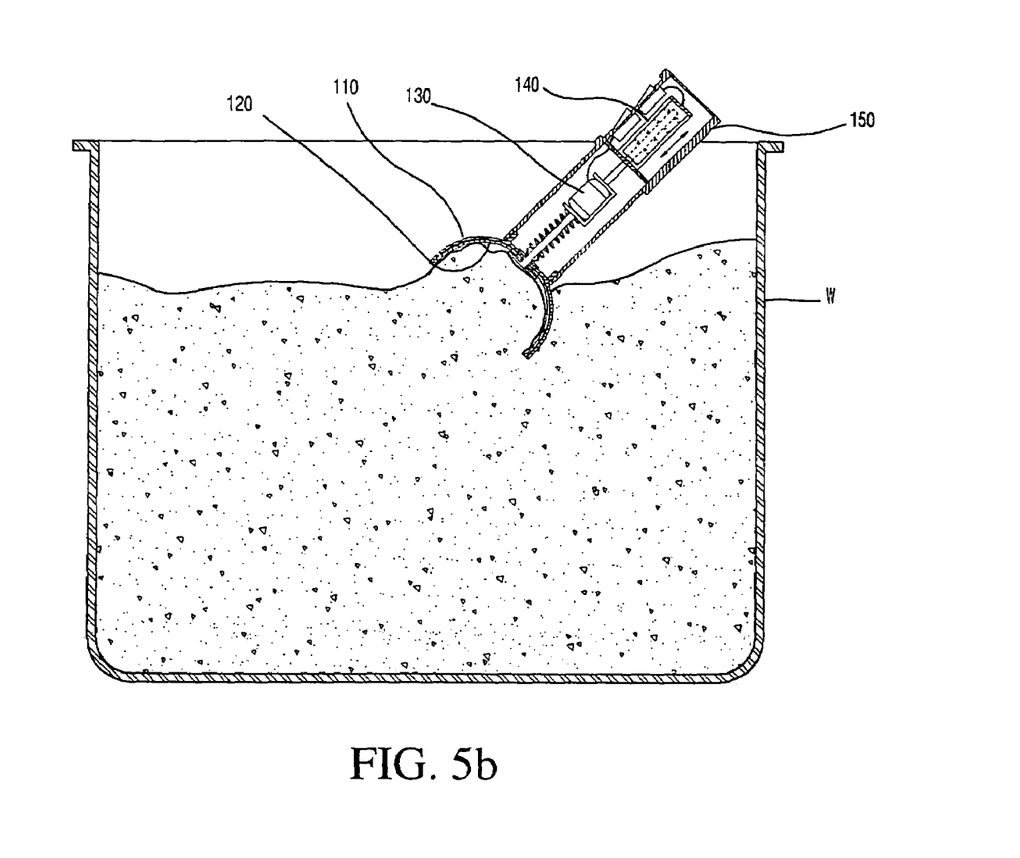
Figure 5C:
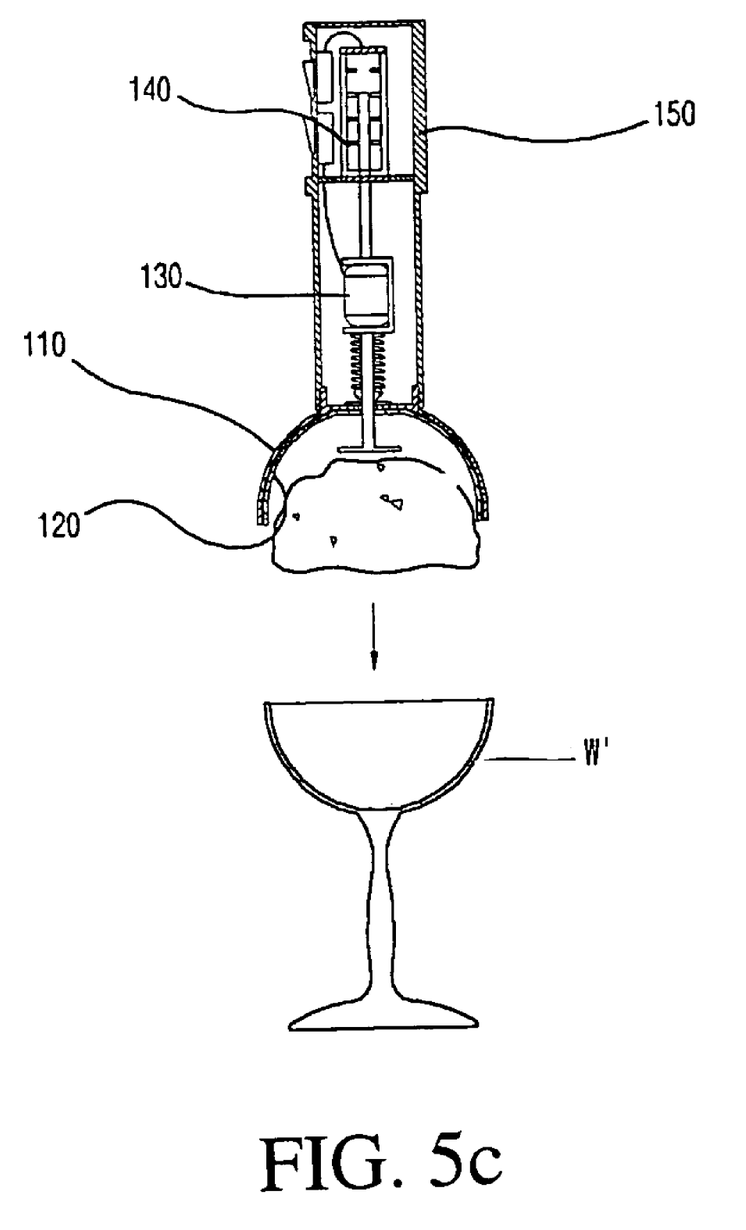

FIGS. 4A and 4B are sectional views illustrating operation states of the electromotion ice-cream disher according to the present invention, and FIGS. 5A and 5B are sectional views illustrating usage state of the electromotion ice-cream disher according to the present invention.

Referring to FIGS. 4A, 4B, 5A and 5B, the holder 110 is placed on ice cream stored in a container W, and the switch part 151 is operated. The power of the battery B is supplied to the drive motor 130 to generate the rotational force. The rotational force of the drive motor 130 is transferred to the spline shaft 137 through the drive shaft. The rotational force transferred to the spline shaft 137 is transferred to the rotational cap 120 so that the rotational cap 120 rotates. Due to the rotation of the rotational cap 120, the sawteeth 123 formed at the lower portion of the rotational cap 120 rotates such that ice cream can be easily taken off. Then, when the switch part 151 is again pressed, the drive motor 130 stops its rotation.

If the switch part 151 is operated after placing the ice cream on another container W', the power of the battery B is applied to the solenoid 140 to drop the rod 141 of the solenoid 140.

The dropped rod 141 drops the ]-shaped bracket 132, the drive motor 130, the spline shaft 137, and the holder plate 138. The dropping of the holder plate 138 pushes the ice cream received in the rotational cap 120, such that the ice cream is put on the another container W'. Then, the switch part 151 is pressed, the power supply to the solenoid 140 is stopped, such that the downward motion of the rod 141 is stopped. In this manner, if the force of the rod 141 is stopped, the elastic force of the elastic spring 139 pushes the drive motor 130 and the rod 141 upward, such that the ice-cream disher is set to an initial state. Accordingly, ice cream can be easily taken and placed on the container through a simple manipulation without any excessive force.

Meanwhile, as shown in FIG. 5B, when taking ice cream from the container W, the ice cream can be more easily taken by inclining the electromotion ice-cream disher at a predetermined angle.

As described above, by installing the rotational cap rotating by the rotational force of the drive motor inside the holder and forming the sawteeth at the lower portion of the rotational cap, the ice cream can be easily taken form the ice-cream container.

Further, the ice cream received in the rotational cap can be easily placed on another container by pushing it through the upward/downward motion of the holder plate disposed at the inner side of the rotational cap by using the downward motion of the rod of the solenoid and the tensile force of the elastic spring.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An electromotion ice-cream disher including a holder for receiving an ice cream taken from a container and a handle connected to the holder for easy grasp, the electromotion ice-cream disher comprising:

a hemispherical rotational cap (120) provided inside the holder (110), wherein the rotational cap (120) is integrally formed with a connecting pipe (125) passing through the holder (110) and has sawteeth (123) at a lower portion, the rotational cap (120) being rotatable within the holder (110) by a stop washer 122;

a spline shaft (137) connected to a drive shaft of a drive motor (130) and inserted/protruded to/from the connecting pipe (125), wherein the spline shaft (137) transfers a rotational force of the drive motor (130) to the rotational cap (120);

a solenoid (140) having a rod (141) connected to the drive motor (130);

an elastic spring (139) installed below the drive motor (130), wherein the drive motor (130) moves upward and downward due to the rod (141) protruded downward when an electric signal is applied to the solenoid (140) and an elastic force of the elastic spring (139);

a holder plate (138) provided at a lower portion of the spline shaft (137) passing through the connecting pipe (125), wherein the holder plate (138) moves upward/downward by the upward/downward motion of the drive motor (130); and a switch part (151) connected to the drive motor (130) and the solenoid (140), wherein the switch part (151) is supplied with power from a battery (B) and controls rotation/stop of the drive motor (130) and the applying and cutting-off of the electric signal to the solenoid (140).

* * * * *